Aug. 15, 1961     E. H. HARRIS     2,996,321
SHAFT LOCKING COLLAR

Filed Feb. 4, 1960

INVENTOR.
EDWARD H. HARRIS
BY
*Merchant & Merchant*
ATTORNEYS

United States Patent Office 2,996,321
Patented Aug. 15, 1961

2,996,321
SHAFT LOCKING COLLAR
Edward H. Harris, Minneapolis, Minn., assignor to Acrometal Products, Inc., a corporation of Minnesota
Filed Feb. 4, 1960, Ser. No. 6,647
2 Claims. (Cl. 287—52.07)

This invention relates generally to shaft locking devices and more particularly it relates to a new and useful shaft locking collar for limiting the axial movement of a body on a shaft.

Generally, my invention employs a washer-like collar having an aperture that is slightly larger in diameter than the shaft upon which it is slidably received and also having a radially offset and axially extended rubber-like button which, upon being compressed against a body positioned on the shaft, causes misalignment between the axes of the collar and the shaft and sets up a binding engagement therebetween.

An object of my invention is the provision of a shaft locking collar which will simply, efficiently, and quickly lock a body which is positioned on a shaft against axial displacement.

A further object of my invention is the provision of a shaft locking collar which is extremely easy to place into the operative position without the use of any additional tools or fasteners.

Another object of my invention is the provision of a shaft locking collar which is constructed so as to withstand a limited amount of torsional force without releasing its locking grip and which is also constructed so as to be extremely easy to disengage from its locking position.

A still further object of my invention is the provision of a shaft locking collar which is durable in construction and which may be economically manufactured.

The above and still further objects of my invention will become apparent from the following detailed specification, appended claims and attached drawings.

Referring to the drawings wherein like reference characters indicate like parts or elements throughout the several views.

Figure 1:
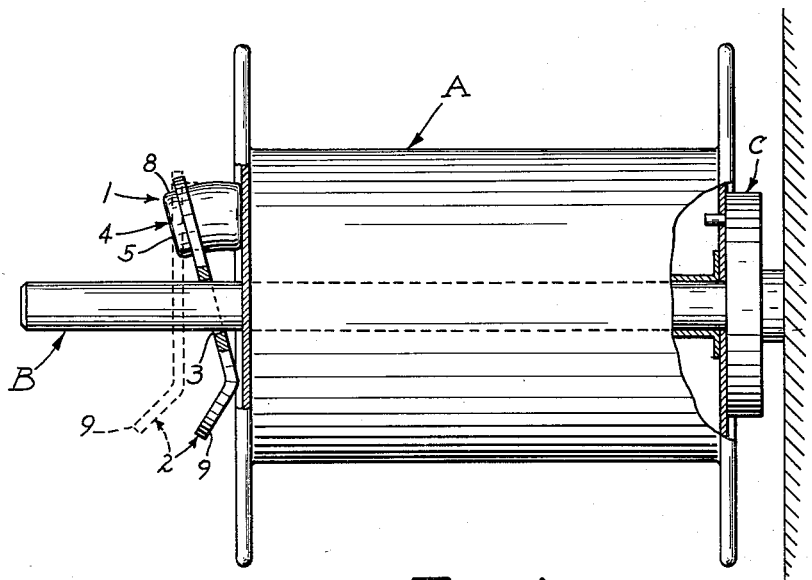
FIG. 1 is a view in side elevation of my novel device in its operative position, some parts being broken away and some parts shown in section, the inoperative position thereof being shown in dotted lines.
Figures 2, 3:
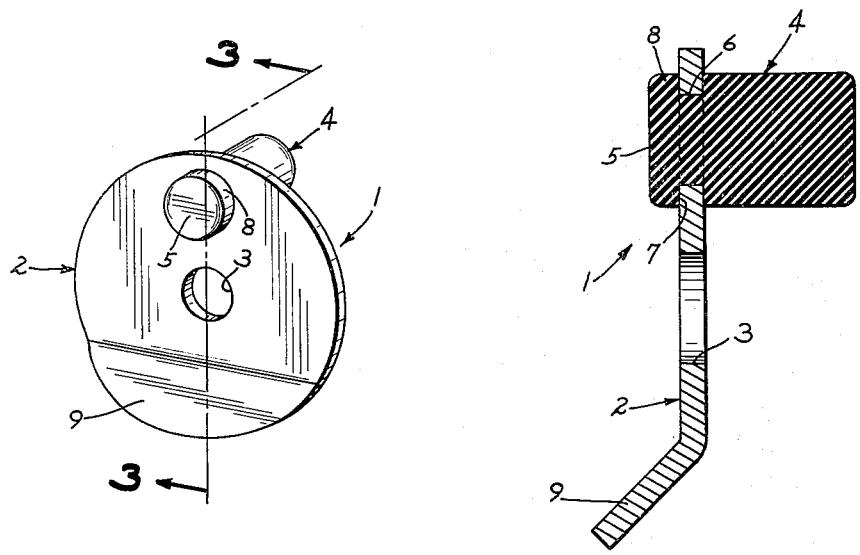
FIG. 2 is a view in perspective.
FIG. 3 is a view in section taken on the line 3—3 of FIG. 2.

Referring with greater particularity to the drawings, FIG. 1 shows my novel shaft locking device, represented generally by the reference numeral 1, in operative engagement with a body A positioned on the shaft B, the body A being locked against rotation about the shaft B by suitable means, represented generally by the reference letter C. The body A, although shown as a reel upon which wire is wound, may be any body which is adapted to rotate upon a spindle or shaft. My novel locking device 1 is particularly useful in connection with a body A which is so used as to necessitate periodic and fast removal from positioning on a shaft B, the operative utility of the locking device being hereinafter explained.

The shaft locking device 1 includes a thin generally flat washer-like collar 2 which has a centrally defined circular aperture 3 that is slightly larger in diameter than the diameter of the shaft B upon which it is to be slidably received so as to permit limited rocking movements of the collar 2 with respect to the shaft B. By way of example, it has been determined that a shaft locking collar 2 which is to be used upon a shaft that is ½ inch in diameter should have an aperture in it which is approximately .508 of an inch in diameter. Although the collar 2 may be of any desired perimetric configuration, it is preferably, and as shown, annular in construction.

The device 1 also includes a rubber-like elongated button 4 secured to the collar 2 in an axially extended position radially outwardly from the axis of the central aperture 3 therein. Preferably, and as shown, the button 4 is secured to the collar 2 by means of the snug reception of one end 5 of the button 4 within a second aperture 6 which is spaced radially outwardly from the aperture 3. The button 4 is preferably, and as shown, annular in cross-section and defines a circumferentially disposed groove 7 spaced near its end 5 so as to define a marginal flange 8 intermediate the groove 7 and the end 5. The inner diameter of the groove 7 corresponds approximately to the diameter of the second aperture 6, and the axial width of the groove 7 corresponds approximately to the thickness of the collar 2, so as to provide means for securing the button 4 to the collar 2. When the button 4 is received within the aperture 6 the groove 7 communicates therewith and disposes the button 4 so as to permit adaptation thereof for yielding engagement with a body A positioned on the shaft B when the collar 2 is in a canted position with respect to the axis of the shaft B so as to thereby cause binding engagement between the collar 2 and the shaft B. When the collar 2 is in the operatively engaged position as shown particularly by the full lines in FIG. 1, the axes of the shaft B and the aperture 3 are angularly disposed with respect to one another.

The collar 2 opposite the button 4 secured thereto is formed so as to define a flange portion 9 which is disposed angularly to the plane of the collar 2 and axially opposite to the extension of the button 4. This flange portion 9 provides means for easily engaging the collar 2 when it is desired to disengage the device 1 from binding engagement with the body A. The flange portion 9 is engaged by the fingers, not shown, of an operator and moved in a generally axial direction away from the body A so as to cause normality between the collar 2 with respect to the axis of the shaft B. In this inoperative position, as shown by the dotted lines of FIG. 1, the axes of the shaft B and the aperture 3 coincide.

Having specifically described my invention the operative simplicity thereof will be outlined. After placing the body A upon the shaft B and locking the same against rotation by suitable means C, the body A is thereafter locked against axial displacement by means of the above described invention. The locking device 1 is placed upon the shaft B with the button 4 disposed toward the body A. Then the locking device 1 is moved to its operatively engaged position, as shown particularly in FIG. 1, wherein the collar 2 is canted with respect to the axis of the shaft B and the button 4 is compressed against the body A so as to cause binding engagement of the aperture 3 with the shaft B. The locking device 1 may thereafter be easily and quickly disengaged as particularly described above. Although my novel invention is shown as restricting axial movement of a body A in only one direction, it should be obvious that the same may also be used on opposite sides of one or more bodies so as to restrict axial displacement thereof in both directions.

This invention has been thoroughly tested and found to be completely satisfactory for the accomplishment of the above objects; and while I have shown a preferred embodiment thereof, I wish it to be specifically understood that same may be modified without departure from the scope and spirit of the appended claims.

What I claim is:

1. A shaft lock comprising, a thin generally flat centrally apertured washer-like collar adapted to be slidably received on a shaft for restricting axial displacement of a body positioned thereon, the aperture in said collar being of a diameter slightly greater than the diameter of the shaft so as to permit limited rocking movements of said collar with respect to the shaft, and a rubber-like axially extending button secured to said collar radially outwardly from the axis of the aperture therein and adapted to yieldingly engage a body positioned on the shaft when said collar is in a canted position with respect to the axis of the shaft so as to thereby cause binding engagement between said collar and the shaft wherein the axes of the shaft and the aperture are angularly disposed with respect to one another.

2. A shaft locking collar comprising, a thin generally flat centrally apertured annular washer-like collar adapted to be slidably received upon a shaft for restricting axial displacement of a body positioned thereon, the aperture in said collar being of a diameter slightly greater than the diameter of the shaft so as to permit limited rocking movements of said collar with respect to the shaft, and a rubber-like button secured to said collar radially outwardly from the axis of the aperture therein, said button extending generally axially from one side of said collar and being adapted to yieldingly engage a body positioned on the shaft when said collar is in a canted position with respect to the axis of the shaft so as to thereby cause binding engagement between said collar and the shaft wherein the axes of the shaft and the aperture are angularly disposed with respect to one another, said collar having a flange portion defined thereby diametrically opposite to said button and disposed angularly to the plane of said collar, said flange portion extending from the other side of said collar, said flange portion being moved in a generally axial direction so as to cause normality of said collar with respect to the axis of the shaft and to cause the axes of the shaft and the aperture to coincide when it is desired to disengage said collar.

References Cited in the file of this patent

UNITED STATES PATENTS

| | | |
|---|---|---|
| 2,560,225 | Hutt | July 10, 1951 |
| 2,638,318 | Nampa | May 12, 1953 |